(12) United States Patent
Wang et al.

(10) Patent No.: US 9,108,503 B2
(45) Date of Patent: Aug. 18, 2015

(54) METHOD TO PRIORITIZE ELECTRIC-ONLY VEHICLE (EV) MODE FOR A VEHICLE

(75) Inventors: Qing Wang, Canton, MI (US);
Xiaoyong Wang, Canton, MI (US);
Ming Lang Kuang, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 263 days.

(21) Appl. No.: 13/160,907

(22) Filed: Jun. 15, 2011

(65) Prior Publication Data

US 2011/0288712 A1  Nov. 24, 2011

(51) Int. Cl.
| | |
|---|---|
| *B60L 9/00* | (2006.01) |
| *B60K 6/445* | (2007.10) |
| *B60W 10/06* | (2006.01) |
| *B60W 10/08* | (2006.01) |
| *B60W 10/26* | (2006.01) |
| *B60W 20/00* | (2006.01) |

(52) U.S. Cl.
CPC ............... *B60K 6/445* (2013.01); *B60W 10/06* (2013.01); *B60W 10/08* (2013.01); *B60W 10/26* (2013.01); *B60W 20/00* (2013.01); *B60W 2550/20* (2013.01); *B60W 2550/402* (2013.01); *B60W 2710/244* (2013.01); *Y02T 10/54* (2013.01); *Y02T 10/6239* (2013.01); *Y02T 10/6291* (2013.01)

(58) Field of Classification Search
CPC ....... B60W 10/06; Y10S 903/93; B60L 15/20
USPC .................................................. 701/22, 36, 54
See application file for complete search history.

(56) References Cited

U.S. PATENT DOCUMENTS

| | | | |
|---|---|---|---|
| 6,483,198 B2 | 11/2002 | Schmitz et al. | |
| 8,428,803 B2* | 4/2013 | Komatsu et al. | 701/22 |
| 2005/0228553 A1* | 10/2005 | Tryon | 701/22 |
| 2005/0274553 A1* | 12/2005 | Salman et al. | 180/65.2 |
| 2006/0180362 A1* | 8/2006 | Yamaguchi et al. | 180/65.2 |
| 2008/0125928 A1* | 5/2008 | Conlon et al. | 701/22 |
| 2008/0281663 A1* | 11/2008 | Hakim et al. | 705/8 |
| 2008/0300743 A1* | 12/2008 | Conlon et al. | 701/22 |
| 2009/0222143 A1* | 9/2009 | Kempton | 700/291 |
| 2011/0166731 A1* | 7/2011 | Kristinsson et al. | 701/22 |

* cited by examiner

*Primary Examiner* — Behrang Badii
*Assistant Examiner* — Daniel L Greene
(74) *Attorney, Agent, or Firm* — David B. Kelley; Brooks Kushman P.C.

(57) ABSTRACT

A vehicle and method for controlling the vehicle includes identifying an electric vehicle (EV) priority zone for the vehicle along a trip path, determining the position of the vehicle with respect to the expected upcoming EV-priority zone; implementing an electric-only mode of operation of the vehicle based on the position of the vehicle and a current operating mode of the vehicle; and implementing a charging mode of operation of the vehicle based on the position of the vehicle and a current operating mode of the vehicle.

18 Claims, 5 Drawing Sheets

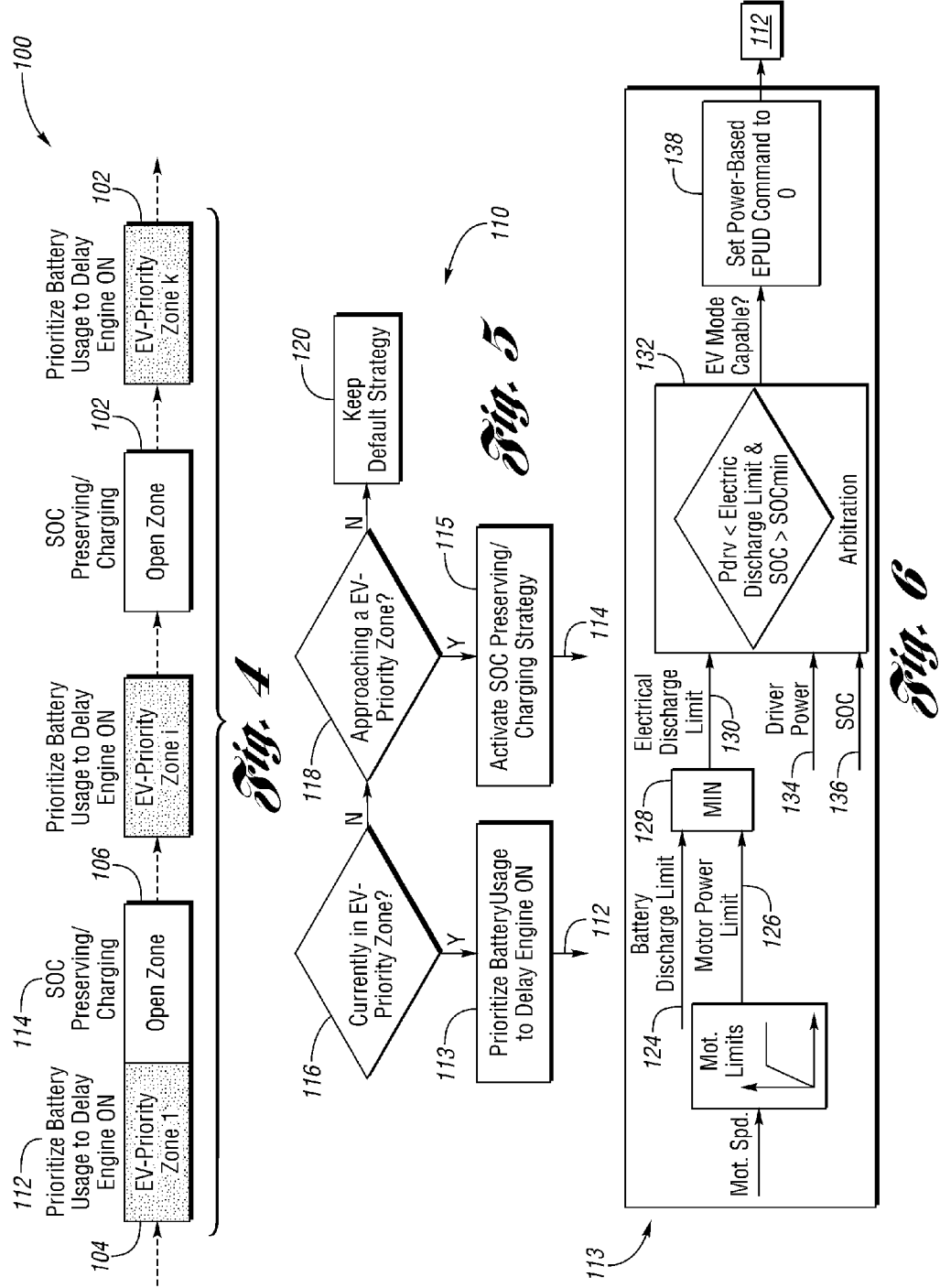

US 9,108,503 B2

METHOD TO PRIORITIZE ELECTRIC-ONLY VEHICLE (EV) MODE FOR A VEHICLE

TECHNICAL FIELD

The disclosure relates to a method of control for a vehicle such as a hybrid or a plug-in hybrid electric vehicle.

BACKGROUND

Hybrid Electric Vehicles (HEVs) typically have power supplied by a battery powered electric motor, an engine, or a combination thereof. Some HEVs have a plug-in feature which allows the battery to be connected to an external power source for recharging, and are called Plug-in HEVs (PHEVs). Electric-only mode (EV mode) in HEVs and PHEVs allows the vehicle to operate using the electric motor alone, while not using the engine. Operation in EV mode may enhance the ride comfort by providing lower noise and better driveability of the vehicle, e.g., smoother electric operation, lower noise, vibration, and harshness (NVH), and faster vehicle response. Operation in EV mode also benefits the environment with zero emissions from the vehicle during this period of operation.

SUMMARY

Various embodiments provide an intelligent way to automatically prioritize the EV operation in EV-desirable areas and encourage the edited vehicle to stay in EV mode for longer than it would under normal operation.

In one embodiment, a method to control a powertrain for a vehicle having electric motor and engine propulsion devices is provided. The method identifies an EV-priority zone for the vehicle along a trip path, determines the position of the vehicle with respect to the expected upcoming EV-priority zone, implements an electric-only mode of operation of the vehicle based on the position of the vehicle and a current operating mode of the vehicle, and implements a charging mode of operation of the vehicle based on the position of the vehicle and a current operating mode of the vehicle.

In another embodiment, a method to control a powertrain for a vehicle having electric motor and engine propulsion devices is provided. The method provides a recommendation for an EV-priority segment along a trip path using at least one of a current driving pattern, a future driving pattern, and geographic information. The current and future driving patterns are provided by a database of possible driving patterns. An electric-only mode of operation of the vehicle is implemented to delay an engine-on command when the vehicle is within the EV-priority segment with a state of charge of a battery above a minimum threshold. A charging mode of operation of the vehicle is also implemented to increase a power output of the engine thereby increasing the state of charge of the battery when the vehicle is approaching the EV-priority segment and the engine is on.

In yet another embodiment, a vehicle is provided with an electric motor, a battery coupled to the electric motor, an engine, and a controller. The electric motor and the engine are coupled to wheels of the vehicle via a transmission. The controller is electronically coupled to the electric motor, the battery, and the engine. The controller is configured to: (i) determine an electric priority segment along a trip path and determine the position of the vehicle along the trip path, (ii) implement an electric-only mode of operation of the vehicle to delay an engine-on command when the vehicle is within an EV-priority segment with a state of charge of a battery above a minimum threshold, and (iii) implement a charging mode of operation of the vehicle to increase power output of the engine, thereby increasing state of charge of the battery when the vehicle is approaching the EV-priority segment and the engine is on.

BRIEF DESCRIPTION OF THE DRAWINGS

FIG. 4 is a schematic depicting zones along a trip and the associated modes of vehicle operation in the respective zones according to embodiment;

FIG. 5 is a schematic of an algorithm to prioritize an EV mode according to an embodiment;

FIG. 6 is a schematic of an algorithm to prioritize battery usage according to an embodiment.

DETAILED DESCRIPTION

Figure 1:
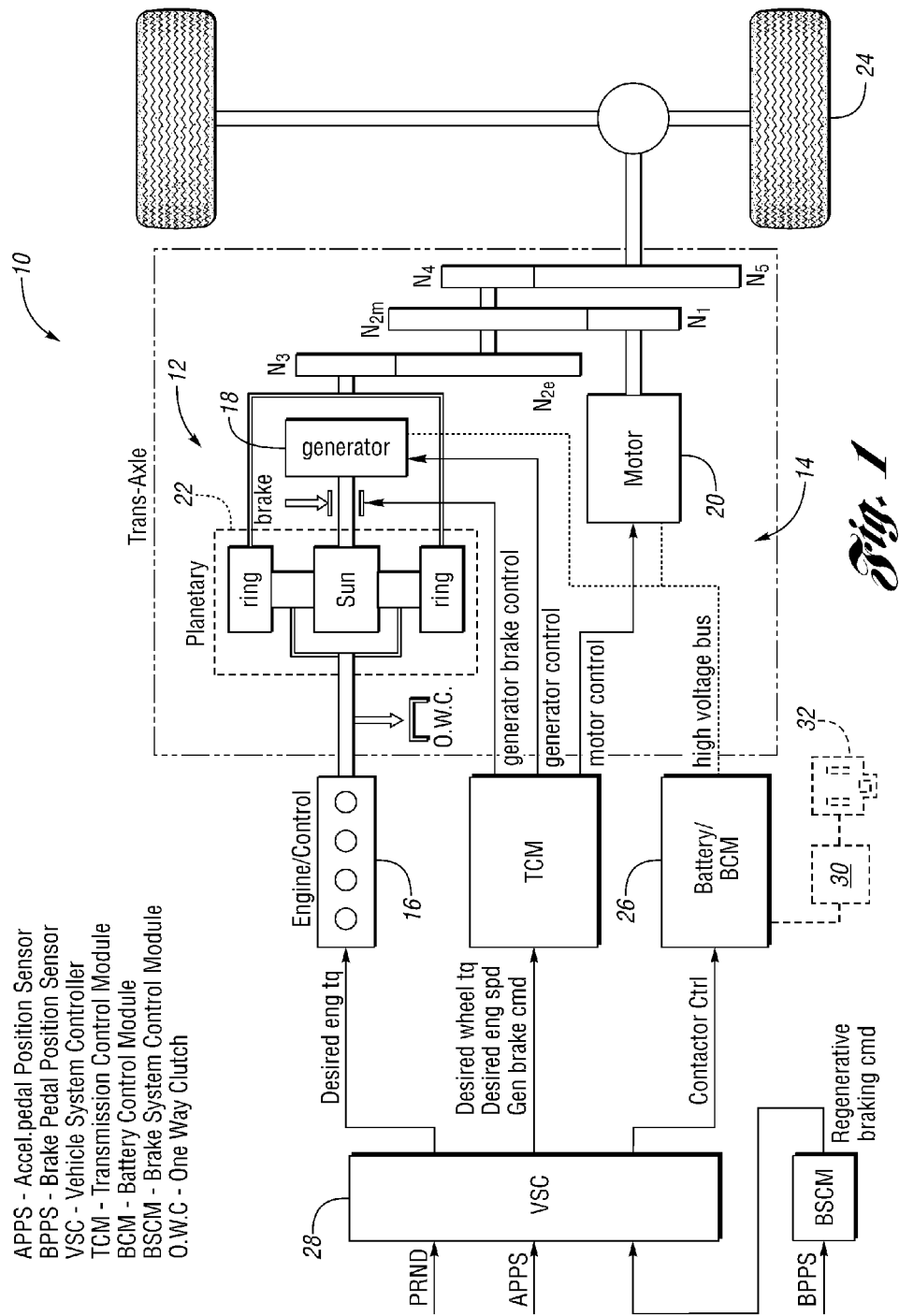
FIG. 1 is a schematic representation of a hybrid electric vehicle powertrain capable of embodying the invention.
Figure 2:
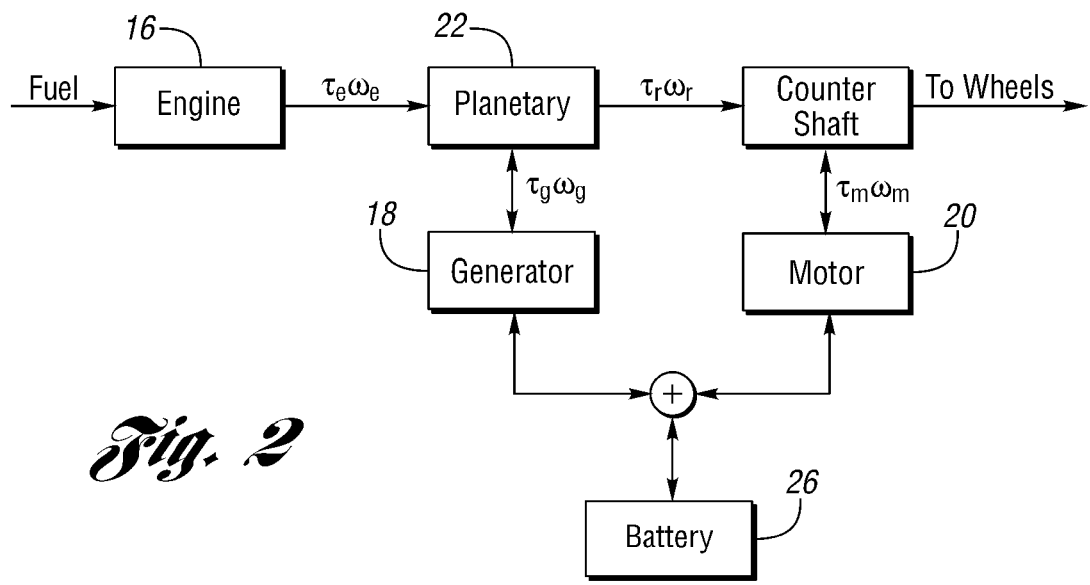
FIG. 2 is a diagram of the power flow paths for the components of the powertrain shown in FIG. 1.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicles may have two or more propulsion devices, such as a first propulsion device and a second propulsion device. For example, the vehicle may have an engine and an electric motor, a fuel cell and an electric motor, or other combinations of propulsion devices as are known in the art. The engine may be a compression or spark ignition internal combustion engine, or an external combustion engine, and the use of various fuels is contemplated. In one example, the vehicle is a hybrid vehicle (HEV), and additionally may have the ability to connect to an external electric grid, such as in a plug-in electric hybrid vehicle (PHEV). The PHEV structure is used in the figures and to describe the various embodiments below; however, it is contemplated that the various embodiments may be used with vehicles having other propulsion devices or combinations of propulsion devices as is known in the art.

A plug-in Hybrid Electric Vehicle (PHEV) involves an extension of existing Hybrid Electric Vehicle (HEV) technology, in which an internal combustion engine is supplemented by an electric battery pack and at least one electric machine to further gain increased mileage and reduced vehicle emissions. A PHEV uses a larger capacity battery pack than a standard hybrid vehicle, and it adds a capability to recharge the battery from an electric power grid, which supplies energy to an electrical outlet at a charging station. This further improves the overall vehicle system operating efficiency in an electric driving mode and in a hydrocarbon/electric blended driving mode.

Conventional HEVs buffer fuel energy and recover kinematic energy in electric form to achieve the overall vehicle system operating efficiency. Hydrocarbon fuel is the principal energy source. For PHEVs, an additional source of energy is the amount of electric energy stored in the battery from the grid after each battery charge event.

While most conventional HEVs are operated to maintain the battery state of charge (SOC) around a constant level, PHEVs use as much pre-saved battery electric (grid) energy as possible before the next battery charge event. The relatively low cost grid supplied electric energy is expected to be fully utilized for propulsion and other vehicle functions after each charge. After the battery SOC decreases to a low conservative level during a charge depleting event, the PHEV resumes operation as a conventional HEV in a so-called charge sustaining mode until the battery is re-charged.

FIG. 1 illustrates an HEV 10 powertrain configuration and control system. A power split hybrid electric vehicle 10 may be a parallel hybrid electric vehicle. The HEV configuration as shown is for example purposes only and is not intended to be limiting as the present disclosure applies to HEVs and PHEVs of any suitable architecture.

In this powertrain configuration, there are two power sources 12, 14 that are connected to the driveline: 12) a combination of engine and generator subsystems using a planetary gear set to connect to each other, and 14) the electric drive system (motor, generator, and battery subsystems). The battery subsystem is an energy storage system for the generator and the motor.

The changing generator speed will vary the engine output power split between an electrical path and a mechanical path. In addition, the control of engine speed results in a generator torque to react against the engine output torque. It is this generator reaction torque that conveys the engine output torque to the ring gear of the planetary gear set 22, and eventually to the wheels 24. This mode of operation is called "positive split". It is noted that because of the kinematic properties of the planetary gear set 22, the generator 18 can possibly rotate in the same direction of its torque that reacts against the engine output torque. In this instance, the generator 18 inputs power (like the engine) to the planetary gear set to drive the vehicle 10. This operation mode is called "negative split".

As in the case of the positive split mode, the generator torque resulting from the generator speed control during a negative split reacts to the engine output torque and conveys the engine output torque to the wheels 24. This combination of the generator 18, the motor 20 and the planetary gear set 22 is analogous to an electro-mechanical CVT. When the generator brake (shown in FIG. 1) is actuated (parallel mode operation), the sun gear is locked from rotating and the generator braking torque provides reaction torque to the engine output torque. In this mode of operation, all the engine output power is transmitted, with a fixed gear ratio, to the drivetrain through the mechanical path.

In a vehicle 10 with a power split powertrain system, unlike conventional vehicles, the engine 16 requires either the generator torque resulting from engine speed control or the generator brake torque to transmit its output power through both the electrical and mechanical paths (split modes) or through the all-mechanical path (parallel mode) to the drivetrain for forward motion.

During operation using the second power source 14, the electric motor 20 draws power from the battery 26 and provides propulsion independently of the engine 16 for forward and reverse motions. This operating mode is called "electric drive" or electric-only mode or EV mode. In addition, the generator 18 can draw power from the battery 26 and drive against a one-way clutch coupling on the engine output shaft to propel the vehicle 10 forward. The generator 18 alone can propel the vehicle 10 forward when necessary. This mode of operation is called generator drive mode.

The operation of this power split powertrain system, unlike conventional powertrain systems, integrates the two power sources 12, 14 to work together seamlessly to meet the driver's demand without exceeding the system's limits (such as battery limits) while optimizing the total powertrain system efficiency and performance. Coordination control between the two power sources is needed. As shown in FIG. 1, there is a hierarchical vehicle system controller (VSC) 28 that performs the coordination control in this power split powertrain system. Under normal powertrain conditions (no subsystems/components faulted), the VSC interprets the driver's demands (e.g. PRND and acceleration or deceleration demand), and then determines the wheel torque command based on the driver demand and powertrain limits. In addition, the VSC 28 determines when and how much torque each power source needs to provide in order to meet the driver's torque demand and to achieve the operating point (torque and speed) of the engine.

The battery 26 is additionally rechargeable in a PHEV vehicle 10 configuration (shown in phantom), using a receptacle 32 which is connected to the power grid or other outside electrical power source and is coupled to battery 26, possibly through a battery charger/converter 30.

The vehicle 10 may be operated in electric mode (EV mode), where the battery 26 provides all of the power to the electric motor 20 to operate the vehicle 10. In addition to the benefit of saving fuel, operation in EV mode may enhance the ride comfort through lower noise and better driveability, e.g., smoother electric operation, lower noise, vibration, and harshness (NVH), and faster response. Operation in EV mode also benefits the environment with zero emissions from the vehicle during this mode.

Regions or sections of roadway may be defined as EV-priority zones, or the driving area where operation of the vehicle 10 in EV mode has benefits as mentioned above. EV-priority zones include city driving zones in an urban area with frequent stops or congested traffic, specific trip segments and geographic regions that have strict emission regulations, etc. Within the EV-priority zones, the vehicle may be operated in EV mode, assuming the vehicle 10 has sufficient battery 26 charge, etc.

The VSC 28 is adapted to recognize EV-priority zones using a driving pattern identification method. The driving pattern identification method uses an algorithm that detects and recognizes real-world driving conditions as one of a set of standard drive patterns, including for example, city, highway, urban, traffic, low emissions, etc. In one embodiment, the algorithm is based on machine learning using a neural network. In other embodiments, the algorithm is based on support vector machines, fuzzy logic, or the like.

Regarding the existing driving pattern identification method, it is known that fuel efficiency is connected to individual driving styles, roadway types, and traffic congestion levels. A set of standard drive patterns, called facility-specific cycles, have been developed to represent passenger car and light truck operations over a broad range of facilities and congestion levels in urban areas. (See, for instance, Sierra Research, 30 'SCF Improvement—Cycle Development', Sierra Report No. SR2003-06-02 (2003).) Driving styles have been captured in these standard drive patterns as well. For example, for the same roadway type and traffic level, different drivers may lead to different drive patterns. An online driving pattern identification method that automatically detects real-world driving condition and driving style and recognizes it as one of the standard patterns has been developed. (See, for example, Jungme Park, ZhiHang Chen, Leonidas Kiliaris, Ming Kuang, AbulMasrur, Anthony Phillips, Yi L. Murphey, 'Intelligent Vehicle Power Control based on Machine Learning of Optimal Control Parameters and Prediction of Road Type and Traffic Congestions', IEEE Transactions on Vehicular Technology, 17 Jul. 2009, Volume 58, Issue 9.) This online driving pattern method is based on machine learning using a neural network and its accuracy has been proven by simulations.

It should be noted that the standard drive patterns that are to be considered for use during EV operation mode may be customized during the feature selection process by varying features including: average vehicle speed, maximum speed average vehicle acceleration, maximum acceleration, number of stops, stopping time, etc. Therefore, the EV-priority zones can be configured and calibrated to fit various customer preferences or profiles.

Figure 3:
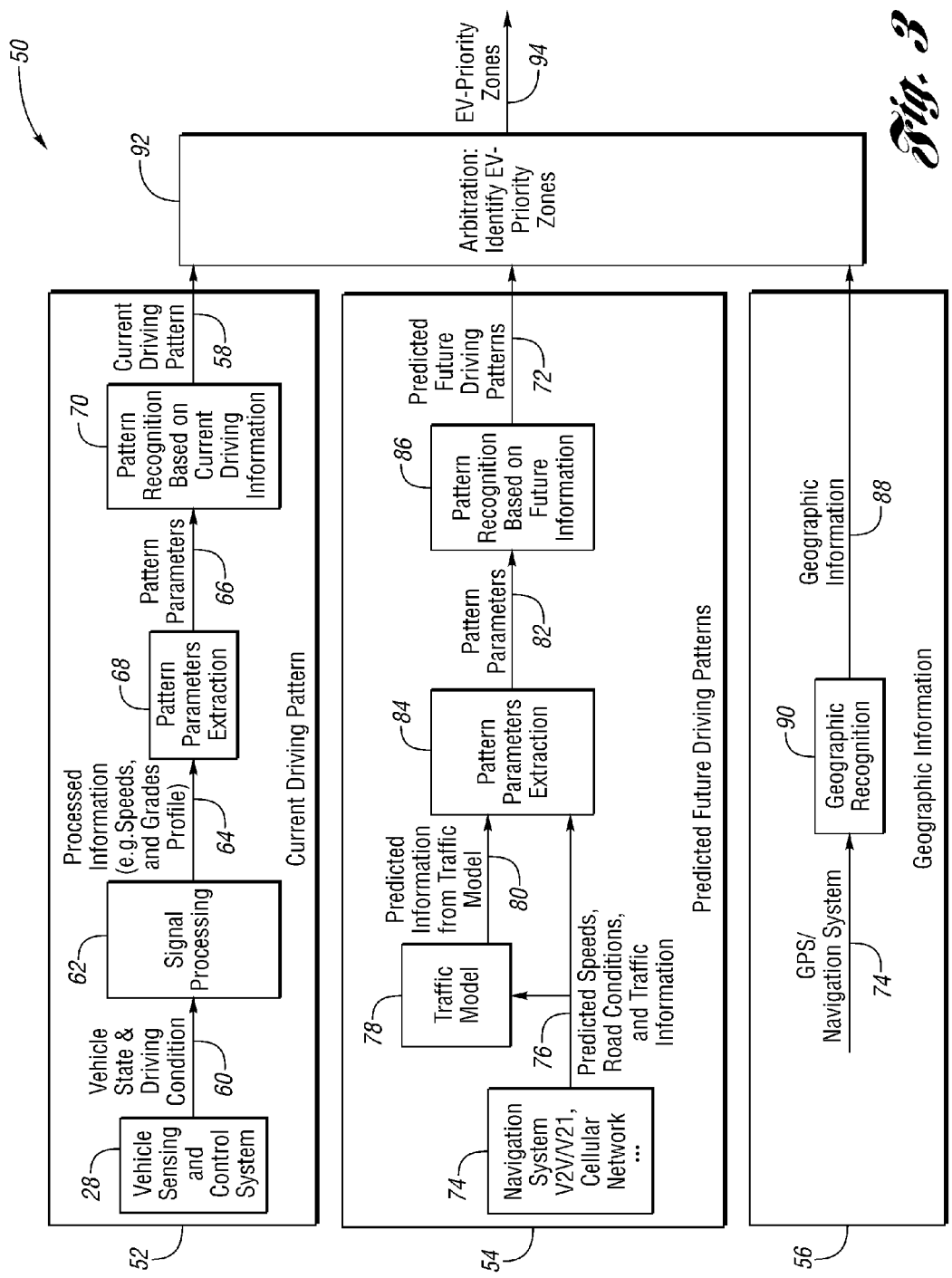
FIG. 3 is a schematic of an algorithm to determine the EV-priority zones according to an embodiment.

FIG. 3 illustrates the algorithm flow 50 for arbitration and identification of EV-priority zones by the VSC 28. The algorithm 50 collects information through various processes, including: current driving pattern 52, predicted future driving patterns 54, and geographic information 56.

The current driving pattern determination process 52 determines the current driving pattern 58 of the vehicle. The current driving pattern 58 may be derived from the vehicle states and driving condition of an immediately recent time frame, such as (t-T, t) where t is the current time and T is a selected time preset. The VSC 28 provides vehicle state information 60, such as engine state, battery state, and the like, to a signal processor 62. The signal processor 62 uses the vehicle state information 60 to determine processed data 64, such as vehicle speed, grade profile, etc. Various selected data 66, or pattern parameters, are extracted from the processed data 64 using a pattern parameter extraction function 68. The pattern parameters 66 are provided as an input to a pattern recognition algorithm 70 which recognizes the current driving pattern 58 from the pattern parameters 66. The pattern recognition algorithm 70 is a driving pattern identification method as described previously.

The predicted future driving patterns process 54 determines one or more predicted future driving patterns 72 of the vehicle along a trip path. The predicted future driving patterns 72 may be derived from various predictive information sources 74, such as signals and data from an on-board navigation system with global positioning, a vehicle to vehicle system (V2V), a vehicle to roadside infrastructure system (V2I), a cellular network, or the like. The sources 74 provide route information 76 to the VSC 28 such as predicted vehicle speeds, predicted road conditions, distances, and the like. A traffic module may be provided to additionally provide predicted traffic information 80 and supplement the route related information 76. Pattern parameters 82 are extracted from the predictive information 78, 80 using a pattern parameter extraction function 84. The pattern parameters 82 are provided as inputs to a pattern recognition algorithm 86 which recognizes the predicted driving pattern 72. The pattern recognition algorithm 86 is a driving pattern identification method as described previously. The algorithm 54 labels each future driving pattern as one of the pre-defined driving patterns and then divides the trip into multiple segments of pre-defined driving patterns.

The geographic information process 56 uses a geographic recognition algorithm 90 to determine geographic information of the trip 88 using data from predictive information sources 74, such as signals and data from an on-board navigation system with global positioning, or the like. The geographic information process 56 may be configured to identify if the current location of the vehicle 10 is within an EV-priority zone (e.g., in an urban area or in a region with strict emission regulations) or in an open zone where there is no preference as to vehicle operation.

An arbitration process 92 receives the current driving pattern 58, predicted future driving patterns 72, and geographic information 88 to determine the EV-priority zones 94 for the vehicle 10 at its present state and/or at various positions along a trip.

An example of EV-priority zones 94 as determined by the arbitration process 92 are illustrated in FIG. 4. The trip 100 is labeled into different segments 102 by the arbitration process 92. The trip 100 is divided into EV-priority zones 104, which favor operation of the vehicle in EV mode, and open zones 106, where there is no preference for the vehicle operation, e.g. EV mode, hybrid mode, etc.

A mode selection algorithm 110, as illustrated in FIG. 5, is used to activate either an EV-priority operation mode 112 using an EV-priority algorithm 113, or an SOC preserving/charging mode 114 using an SOC preserving/charging algorithm 115. For example, the EV priority operation mode 112 causes the vehicle to operate using battery power, and delay engine operation. The state of charge (SOC) preserving/charging mode 114 causes the vehicle to store or retain additional electrical energy in the battery, while the engine is operating.

The modes 112, 114 may be scheduled to correspond with various trip zones 102. For example, the EV priority operation mode 112 is predictively scheduled to operate when the vehicle is in an EV-priority zone 104 based on the algorithm 113. The SOC preserving/charging mode 114 is predictively scheduled to operate when the vehicle is in an open zone 106 prior to entering an EV-priority zone 104, based on the algorithm 115.

For the mode selection process 100, the algorithm 110 determines if the vehicle is currently in an EV-priority zone 106 at step 116. If the vehicle is in an EV-priority zone 106, the algorithm 110 runs the EV priority algorithm 113 to prioritize battery usage to delay operation of the engine and operate the vehicle in mode 112. If the vehicle is not in an EV-priority zone 104, the algorithm 110 proceeds to step 118, which determines if the vehicle is approaching an EV-priority zone 104, and may call algorithm 115. If the vehicle is approaching an EV-priority zone 104, for example, within a specified distance or travel time of the zone 104, the algorithm 110 runs the SOC charging/preserving algorithm 115 to activate the SOC preserving/charging mode 114 to conserve or add additional electric energy to the battery to prepare for the expected upcoming EV-priority zone 104 and EV operation. If the vehicle 10 is not approaching an EV-priority zone 104 at step 118, the algorithm 100 causes the vehicle to continue operation under its current or default strategy 120. The default strategy 120 may be electric and/or engine operation based on the operating conditions of the vehicle 10 as determined using the VSC 28.

In various embodiments, the algorithm 110 may be overridden due to other priority events where the vehicle 10 is required to operate in an EV mode, engine mode, or a combination thereof. For example, a priority event may be a high-priority engine ON/OFF command, caused by temperature constraints, battery discharge limits, battery over-voltage protection, engine cold start, and the like.

FIG. 6 illustrates an embodiment of the algorithm 113 to determine operation in an EV priority mode 112 by prioritizing the battery usage to delay engine operation in the vehicle 10. The algorithm 122 receives the battery discharge limits 124 and the electric motor power limits 126. The algorithm 122 compares the limits 124, 126 at step 128 to determine the electrical discharge limit 130. An arbitration process 132 determines if the vehicle 10 is capable of running in electric only operation by comparing the electric discharge limit 130 to the requested driver power 134. The arbitration process 132 also determines if the SOC of the battery 136 is above the minimum threshold state of charge. If the current electrical limit 130 is high enough to operate the electric motor to meet the driver power command 134, and the SOC 136 is above the minimum threshold, the vehicle is capable of operation in EV mode and the process 122 sets the default power-based engine pull-up pull-down (EPUD) command to zero at step 138, which causes the vehicle 10 to operate in EV mode 112 if no other conditions trigger a higher priority engine ON command.

Figure 7:
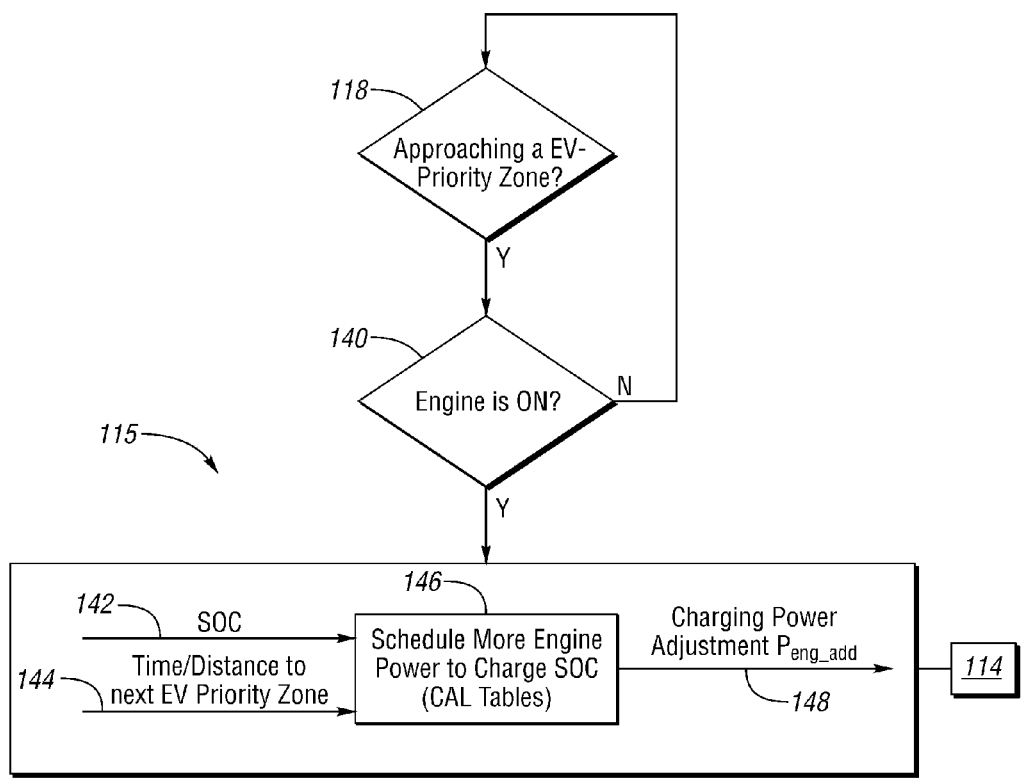
FIG. 7 is a schematic of an algorithm to control state of charge of a battery before an expected upcoming EV-priority zone according to an embodiment.

FIG. 7 illustrates an embodiment of the algorithm 115 which determines preserving/charging the SOC 114. The algorithm 115 is activated if the vehicle is approaching an EV-priority zone 104, as determined by step 118, and when the engine is operating as determined by step 140. The algorithm 115 receives the SOC of the battery 142, and time or distance information 144 to the next EV-priority zone. Based on a calibration table 146, or other function, the algorithm 115 increases the engine power output by making a power adjustment 148. The additional engine power 148 for charging battery may be scheduled as a function of the SOC, and the remaining time or distance to the next EV-priority zone 104. The power adjustment 148 is set at zero for normal operation. The power adjustment 148 acts to increase the engine power compared to what it would normally produce under the present operating condition to provide excess power to charge the battery. The algorithm 115 operates when the engine is already operating to provide opportunistic charging of the battery. In some embodiments, the algorithm 115 will not pull the engine to operate if it is not running at that point.

The flowchart 50 represents control logic which may be implemented by the VSC 28, or another controller within the vehicle 10, using hardware, software, or combination of hardware and software. For example, the various functions may be performed using a programmed microprocessor. The control logic may be implemented using any of a number of known programming or processing techniques or strategies and is not limited to the order or sequence illustrated. For instance, interrupt or event-driven processing is employed in real-time control applications, rather than a purely sequential strategy as illustrated. Likewise, parallel processing, multitasking, or multi-threaded systems and methods may be used.

The methods and algorithms are independent of any particular programming language, operating system processor, or circuitry used to develop and/or implement the control logic illustrated. Likewise, depending upon the particular programming language and processing strategy, various functions may be performed in the sequence illustrated at substantially the same time or in a different sequence. The illustrated functions may be modified or in some cases omitted without departing from the spirit or scope of the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method to control a powertrain for a vehicle comprising:
generating, via a vehicle system controller, an Electric Vehicle (EV) priority zone based on a current driving pattern and a predicted future driving pattern determined by the controller;
determining, via the controller, a position of the vehicle with respect to an EV-priority zone;
controlling an electric motor via the controller to implement an electric-only mode of operation of the vehicle based on the position of the vehicle with respect to the EV-priority zone and a current operating mode of the vehicle;
controlling an engine via the controller to increase engine power output and implement a charging mode of operation of the vehicle when the vehicle is approaching the EV-priority zone and the engine is already operating to increase a state of charge of a battery; and
controlling the electric motor via the controller to maintain the electric-only mode of operation when the vehicle is approaching the EV-priority zone and the engine is not already operating such that the engine stays in an off state.

2. The method of claim 1 wherein the current driving pattern and the predicted future driving pattern are provided by a database of possible driving patterns.

3. The method of claim 1 further comprising customizing the implementation of the electric-only mode of operation through user inputs to the vehicle.

4. The method of claim 1 wherein implementing the electric-only mode of operation includes operating in electric-only mode when the vehicle enters the EV-priority zone.

5. The method of claim 4 wherein implementing the electric-only mode of operation includes prioritizing usage of battery power during operation in electric-only mode in the EV-priority zone.

6. The method of claim 4 wherein implementing the electric-only mode of operation includes delaying an engine-on command during operation in electric-only mode in the EV-priority zone unless a vehicle power load requiring engine operation is present.

7. The method of claim 1 wherein the EV-priority zones are identified by retrieving geographic information for a trip from a global positioning navigation system.

8. The method of claim 7 wherein the EV-priority zone is identified by arbitrating the current driving pattern, the predicted future driving pattern, and the geographic information for the trip.

9. The method of claim 1 wherein the current driving pattern is determined using a driving pattern identification method implemented by machine learning.

10. The method of claim 9 wherein the driving pattern identification method uses a series of parameters extracted from the current operating mode of the vehicle and a current driving condition.

11. The method of claim 1 wherein the predicted future driving pattern is determined using a driving pattern identification method implemented by machine learning.

12. The method of claim 11 wherein the driving pattern identification method uses a series of parameters extracted from predicted vehicle conditions and predicted trip conditions.

13. A vehicle comprising:
an electric motor;
a battery coupled to the electric motor;
an engine, wherein the electric motor and the engine are coupled to wheels of the vehicle via a transmission; and
a vehicle system controller electronically coupled to the electric motor, the battery, and the engine wherein the controller is configured to: (i) generate an electric priority segment along a trip path and determine a position of the vehicle along the trip path, (ii) control the electric motor to operate and implement an electric-only mode of operation of the vehicle to delay an engine-on command when the vehicle is within the electric priority segment with a state of charge of a battery above a minimum threshold, (iii) control the engine to continue to operate and implement a charging mode of operation of the vehicle to increase power output of the engine when the engine is already operating, thereby increasing a state of charge of the battery when the vehicle is approaching the electric priority segment using opportunistic charging, and (iv) control the electric motor to operate to maintain the electric-only mode of operation when the engine is not operating and the vehicle is approaching the electric priority segment such that the engine remains in an off state.

14. The vehicle of claim 13 further comprising an electric power receptacle coupled to the vehicle for charging the battery from an external power source.

15. The vehicle of claim 13 further comprising a database of possible driving patterns, wherein the vehicle system controller uses a first driving pattern identification method to identify a current driving pattern and uses a second driving pattern identification method to identify a predicted future driving pattern from the database of possible driving patterns;
wherein the vehicle system controller is configured to arbitrate the current driving pattern, predicted driving pattern, and geographic information to generate the electric priority segment along the trip path.

16. The vehicle of claim 13 wherein the vehicle system controller is configured to increase power output of the engine using a state of charge of the battery and distance information to the next electric priority segment.

17. A method to control a vehicle comprising:
controlling, using a controller, an electric motor to propel the vehicle based on vehicle position within an Electric Vehicle priority zone generated by the controller determined using a current driving pattern and a predicted future driving pattern; and
controlling, using the controller, an engine to increase power output to charge a battery in response to the vehicle approaching the zone only when the engine is already operating.

18. The method of claim 17 further comprising controlling, using the controller, only the electric motor to propel the vehicle when the vehicle is approaching the zone and the engine is not operating such that the engine remains off.

* * * * *